United States Patent
Stählin

(10) Patent No.: US 12,238,572 B2
(45) Date of Patent: Feb. 25, 2025

(54) SYSTEM AND METHOD OF CONGESTION REDUCTION IN VEHICLE-TO-EVERYTHING (V2X) SYSTEMS

(71) Applicant: Continental Automotive Systems, Inc., Auburn Hills, MI (US)

(72) Inventor: Ulrich Stählin, Oakland Township, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 334 days.

(21) Appl. No.: 17/557,265

(22) Filed: Dec. 21, 2021

(65) Prior Publication Data

US 2023/0199555 A1 Jun. 22, 2023

(51) Int. Cl.
*H04W 28/02* (2009.01)
*H04W 48/06* (2009.01)
*H04W 4/40* (2018.01)

(52) U.S. Cl.
CPC ... *H04W 28/0289* (2013.01); *H04W 28/0284* (2013.01); *H04W 48/06* (2013.01); *H04W 4/40* (2018.02)

(58) Field of Classification Search
CPC ......... H04W 28/0289; H04W 28/0284; H04W 48/06; H04W 4/40; H04W 28/04; H04L 47/32; H04L 47/12
See application file for complete search history.

(56) References Cited

U.S. PATENT DOCUMENTS

| | | | |
|---|---|---|---|
| 6,646,985 B1 * | 11/2003 | Park | H04Q 11/0478 709/212 |
| 8,314,718 B2 | 11/2012 | Muthaiah et al. | |
| 8,892,347 B1 | 11/2014 | Ibrahim | |
| 9,959,751 B2 | 5/2018 | Scherping et al. | |
| 10,454,838 B2 | 10/2019 | Stählin et al. | |
| 2006/0245359 A1 | 11/2006 | Hosein | |
| 2020/0229206 A1 | 7/2020 | Badio et al. | |
| 2020/0377128 A1 | 12/2020 | Marczuk et al. | |
| 2023/0164769 A1 * | 5/2023 | Radhakrishnan | H04W 72/20 370/329 |

FOREIGN PATENT DOCUMENTS

| | | |
|---|---|---|
| CN | 111970661 A | 11/2020 |
| DE | 102019200732 A1 | 4/2020 |
| EP | 2624604 A1 | 8/2013 |
| EP | 3843491 A1 | 6/2021 |
| IN | 202141053570 * | 11/2021 |
| WO | 2019137622 A1 | 7/2019 |
| WO | WO-2020033477 A1 * | 2/2020 ............ H04W 24/08 |

OTHER PUBLICATIONS

International Search Report and Written Opinion dated Apr. 18, 2023 from corresponding International patent application No. PCT/US2022/053631.

* cited by examiner

*Primary Examiner* — Chi H Pham
*Assistant Examiner* — Samuel Dilan Rutnam

(57) ABSTRACT

A vehicle control unit (VCU) or other vehicle device to accept a reduced number of messages from a sender for processing rather than having the sender transmit messages less often when a communication channel is crowded. The overall number of messages that need to be processed after accepting the messages stays the same, but the number of messages accepted per sender per time interval is reduced.

20 Claims, 4 Drawing Sheets

SYSTEM AND METHOD OF CONGESTION REDUCTION IN VEHICLE-TO-EVERYTHING (V2X) SYSTEMS

TECHNICAL FIELD

The technical field is communications in vehicle-to-everything (V2X) communications.

BACKGROUND

In vehicle-to-everything (V2X) systems, communications are exchanged between vehicles and other entities. For example, V2X communications may cover communications between a vehicle and other vehicles, between the vehicle and roadside infrastructure, or between the vehicle and various communications networks. With large amounts of messages being exchanged, communication congestion sometimes occurs.

In fact, V2X communications typically do not scale well in terms of the processing power needed to transmit, receive, and process messages. Depending upon how many V2X messages are received, the processing power needed or used can quickly increase since the processing power required is typically linearly dependent on the message count. Some previous approaches attempted to reduce this problem, but these previous approaches were not completely successful.

BRIEF DESCRIPTION OF THE DRAWINGS

For a more complete understanding of the disclosure, reference should be made to the following detailed description and accompanying drawings wherein.

Figure 1:
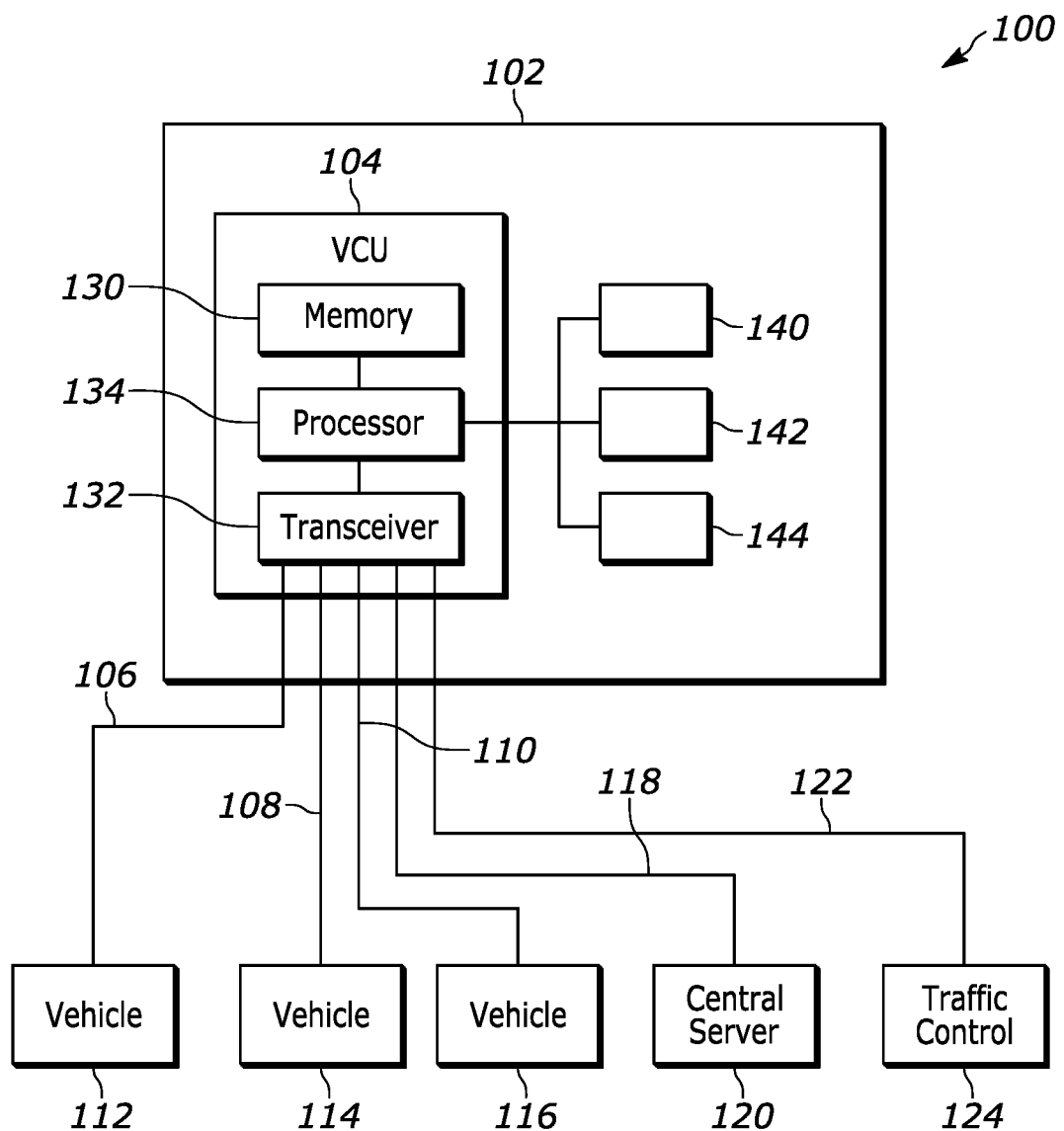
FIG. 1 comprises a diagram of a system according to various embodiments of the present invention.

Skilled artisans will appreciate that elements in the figures are illustrated for simplicity and clarity. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

The approaches provided herein allow a vehicle control unit (VCU) or other electronic device to accept a reduced number of messages from a sender for processing rather than having the sender transmit messages less often when a communication channel is crowded or used. The overall number of messages that are processed after accepting the messages stays the same, but the number of messages accepted per sender per time interval is reduced.

For example, the system may process only every second message from a sender (reducing the processing rate to half the previous processing rate). In another example, the system processes two messages from a sender then drops the next message (dropping the processing rate to two-thirds of the processing rate). In still another example, the system only processes every third message from a sender (reducing the rate to a third of the previous processing rate).

In other aspects and to obtain more stable system behavior that does not change message processing too often, a hysteresis approach can be used. In still other aspects, the threshold could be based on a moving average for the message count, where ideally the length of the sliding window for calculating the average could be configured.

The approaches described herein lead to a larger time between messages being processed from particular senders. But, the extended amount of time between processing is relatively small (e.g., in the area of several 100 ms) compared to vehicle dynamics and driver reaction times. On the other hand, messages from more individual senders are received so overall a broader picture of the environment can be generated inside the receiving unit.

Instead of the sender ID or in combination with it, pseudonyms attached to each message can be used since they are also related to a specific sender. The pseudonyms and the ID might change over time for each sender, but this does not impact the overall performance of the pre-processing since changing times are more in the area of minutes where the filtering dynamics are in the area of fraction of seconds. Other congestion control approaches can be combined with the present approaches to further reduce the message count.

Advantageously, the invention solves the problem of congestion without impact on the end consumer of perceived functionality. More senders can be examined after the pre-processing, which is traded in for a less accurate representation of their activity (due to more time between two messages passing the pre-processing).

In many of these embodiments, an approach for reducing congestion in a vehicle-to-everything (V2X) network includes receiving electronic messages from senders over a communication channel; determining a sender identifier for each of the electronic messages. and storing the sender identifiers in an electronic memory. The approach further comprises storing a plurality of thresholds in the electronic memory, each of the plurality of thresholds being associated with a particular sender identifier from the sender identifiers; and determining a channel load for the communication channel. For each of the electronic messages received over the communication channel the approach comprises: determining whether the channel load exceeds a threshold associated with a sender associated with each electronic message; and when the channel load exceeds the threshold, processing a reduced amount of future messages from the sender associated with the electronic message.

In aspects, the channel load defines an amount of the channel being utilized for messages over a timeframe or time period. In examples, this may be expressed as a percentage.

In examples, processing a reduced amount of future messages comprises processing only every nth message received from the sender, where n is an integer. In other examples, processing a reduced amount of future messages comprises processing n messages from the sender, then dropping m messages from the sender, where n and m are integers. Other examples are possible.

In other aspects, hysteresis is used to halt the processing of the reduced number of messages. In other words, hysteresis is used to halt the application of the congestion control approaches described herein. In one specific example, a first threshold for channel usage is used to determine when to apply the congestion control approach, while a second and different threshold for channel usage is used to determine when to halt using the congestion control approach.

In other examples, the sender identifier comprises a numeric or alphanumeric value. In still other examples, the sender identifier comprises a sender pseudonym. Other examples and combinations of user identifies are possible.

In others of these embodiments, a system for reducing congestion in a vehicle-to-everything (V2X) network includes an electronic memory, a transceiver device, and a processor. The transceiver device is configured to receive electronic messages from senders over a communication channel. The processor is coupled to the transceiver device and the electronic memory. The processor is configured to: determine a sender identifier for each of the electronic messages, and store the sender identifiers in the electronic memory; store a plurality of thresholds in the electronic memory, each of the plurality of thresholds associated with a particular sender identifier from the sender identifiers; determine a channel load for the communication channel; and for each of the electronic messages received over the communication channel: determine whether the channel load exceeds a threshold associated with a sender associated with each electronic message; and when the channel load exceeds the threshold, process a reduced amount of future messages from the sender associated with the electronic message.

In still others of these embodiments, a non-transitory, machine-accessible storage medium has computer instructions. The instructions are configured, when executed on a processor to cause the machine to: receive electronic messages from senders over a communication channel, determine a sender identifier for each of the electronic messages, and store the sender identifiers in an electronic memory; store a plurality of thresholds in the electronic memory, each of the plurality of thresholds associated with a particular sender identifier from the sender identifiers; determine a channel load for the communication channel;

for each of the electronic messages received over the communication channel; determine whether the channel load exceeds a threshold associated with a sender associated with each electronic message; and when the channel load exceeds the threshold, process a reduced amount of future messages from the sender associated with the electronic message.

Referring now to FIG. 1, one example of a system for reducing congestion in a V2X network is described. The system includes a vehicle 102 and the vehicle 102 includes a vehicle control unit (VCU) 104. The vehicle control unit 104 includes an electronic memory 130, a transceiver device 132, and a processor or control circuit 134.

The vehicle 102 may be a passenger car, truck, aircraft, drone, automated vehicle, ship, or other vehicle. Other examples of vehicles are possible.

The vehicle 102 includes systems or subsystems 140, 142, and 144 that couple to the processor 134. The systems or subsystems 140, 142, and 144 may include the engine system, the braking system, the tire system, and the entertainment systems of the vehicle 102 to mention a few examples. Messages (e.g., V2X or V2X compliant messages) received from other users, in some aspects, are used to control, guide, inform, and/or operate these systems. For example, the messages may set parameters that alter the operation of these components. In another example, the messages directly control the operation of these components. In aspects, the processor 134 sends control signals to the subsystems 140, 142, and 144 and/or exchanges information or messages with the subsystems 140, 142, and 144.

The electronic memory 130 is any type of electronic memory device. For example, the electronic memory 130 may be or can include any one or combination of volatile memory elements (e.g., random access memory (RAM), such as dynamic RAM (DRAM), static RAM (SRAM), synchronous dynamic RAM (SDRAM), video RAM (VRAM), and so forth)) and/or nonvolatile memory elements (e.g., read only memory (ROM), hard drive, tape, CD-ROM, and so forth). Moreover, the memory may incorporate electronic, magnetic, optical, and/or other types of storage media. The memory can also have a distributed architecture, where various components are situated remotely from one another, but can be accessed by the processor.

The transceiver device 132 is configured to transmit and/or receive electronic messages to and/or from senders over communication channels 106, 108, and 110. The communication channels 106, 108, and 110 may be wireless communication channels defined by a frequency or multiple frequencies in some examples. In other examples, the communication channels 106, 108, and 110 may be wired. Other examples of communication channels are possible. Some of the messages transmitted and/or received are V2X-compliant messages (also referred to as V2X messages herein) and these messages are compliant with any selected V2X protocol.

In this case, the communication channels 106, 108, and 110 communicate with other vehicles 112, 114, and 116. Another communication channel 118 communicates with a central server 120. Still another communication channel 122 communicates with a traffic control device 124. The traffic control device 124 may be, in examples, a traffic light. Other examples of traffic control devices are possible. The transceiver device 132 may be any combination of hardware or software that enables the transmission or reception of electronic messages including formatting, decoding, and encoding functions. Other examples of functions are possible.

The processor 134 is coupled to the transceiver device 132 and the electronic memory 130. It will be appreciated that as used herein the term "processor" or "control circuit" refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The processor 134 may be configured (for example, by using corresponding programming stored in a memory as will be well understood by those skilled in the art) to carry out one or more of the steps, actions, and/or functions described herein. The processor 134 may include a memory that includes computer instructions that implement any of the functions described herein.

During one phase, the system determines user identifiers and associates these with thresholds. In these regards, the processor 134 is configured to determine a sender identifier for each of the electronic messages that are received. The processor 134 then stores the sender identifiers in the electronic memory 130. The processor 134 also stores a plurality of thresholds in the electronic memory 130 and each of the plurality of thresholds is associated by the processor 134 with a particular sender identifier. In aspects, the memory 130 will now include a list of sender identifiers that are associated with thresholds.

Various approaches may be utilized to determine the thresholds. The thresholds may represent a channel load or capacity above which for a particular sender a reduced number of messages are processed by the processor 134. The thresholds may be selected to take into account such factors as the type of communication channel or the type of sender. For example, a sender that is involved in emergency services (e.g., the police or fire department) may have a higher threshold than an individual. In another example, senders that are known by the owner of the vehicle may have higher thresholds than unknown individuals. The thresholds may be fixed (e.g., programmed into the memory once) or the thresholds may dynamically be changed over time. In other aspects, the thresholds may be channel and sender specific. That is, there may be one threshold for a sender using channel A, and another and different threshold for the sender when the sender is using channel B. In still other aspects, the threshold is the same for the sender regardless of the exact communication channel being used by the sender. In still other aspects, the threshold is the same for each sender using channel A, but different between Channel A and Channel B.

During an operational phase (after the initial phase described above has occurred), the processor 134 determines whether to apply a congestion management approach to various senders that are sending messages. In these regards, the processor 134 is configured to determine a channel load for the communication channel over which messages are being received. In aspects, the channel load defines an amount of the channel being utilized for messages over a timeframe or time period. For instance, the channel load may specify a percentage of the total bandwidth being used. In aspects, the channel load is expressed as a percentage of the channel being used (e.g., the busy time of the channel divided by the busy time plus idle time for a time period). Other definitions for channel load are possible.

The channel load may be measured by the processor 134 via the transceiver device 132, which monitors the amount of messages or usage of a particular communication channel. The monitoring may measure an instantaneous value or the average bandwidth and may be determined over a period of time. The total bandwidth or usage may be for all communication traffic on the communication channel. In other examples, the total bandwidth or usage may be for only communication traffic involving the sender or groups of particular senders on the communication channel.

Messages from various senders are received at the processor 134 via the transceiver device 132. For each of the electronic messages received over the communication channel, the processor 134 determines whether the channel load exceeds the threshold associated with a sender of each electronic message. In these regards, the transceiver 132 receives and decodes the messages and, in some examples, with the processor 134 determines the sender of the message. The processor 134 then accesses the memory 130 and finds the threshold associated with the sender that has been identified. In some examples, the senders and thresholds are configured to arranged in the memory 130 as a lookup table and the processor 134 finds the sender identifier and then obtains the threshold. When the channel load exceeds the threshold, the processor 134 processes a reduced amount of future messages from the sender associated with the electronic message.

The processor 134 may perform these checks each time a message is received from any sender. That is, a test may be performed with each message received at the transceiver 132 and a congestion reduction scheme implemented upon the next detection of a channel load exceeding a threshold. However, in other examples the processor 134 may only perform the checks periodically. In still other examples, groups of messages are received from particular senders and each group is separately analyzed. For example, 100 messages may be received from a sender and the channel load determined and a comparison to the threshold made. If the check of the channel load and comparison to the threshold indicates congestion control should be used, then congestion control is applied to the group of 100 messages (e.g., process only some of these messages as described elsewhere herein).

The processor 134 may also monitor channel usage to determine when to remove or discontinue usage of the congestion reduction scheme. For example, the processor 134 monitors the channel usage and continues to implement the congestion management scheme as long as the channel usage exceeds the threshold. When the channel usage falls at or below the threshold, the congestion reduction scheme is discontinued and all messages from the sender are processed by the processor 134.

In other aspects, hysteresis is used where a first threshold is utilized to determine when to implement congestion control and a second threshold is used to determine when to halt using congestion control. These thresholds are different. In some other aspects, the processor 134 halts processing a reduced number of messages when the channel load falls below the second threshold. In examples, the second threshold is less than the first threshold (used to trigger the reduced processing). Consequently, each sender has a first threshold (to switch to a congestion control state) and a second threshold (to switch from the congestion control state to the non-congestion control state).

The congestion management schemes deployed involves reducing the number of future messages being processed by the processor 134 for a particular sender. In examples, processing a reduced amount of future messages comprises processing only every nth message received from the sender, where n is an integer. In other examples, processing a reduced amount of future messages comprises processing n messages from the sender, then dropping m messages from the sender, where n and m are integers. Other examples of congestion management where the number messages processed by the processor 134 are possible.

Figure 2:
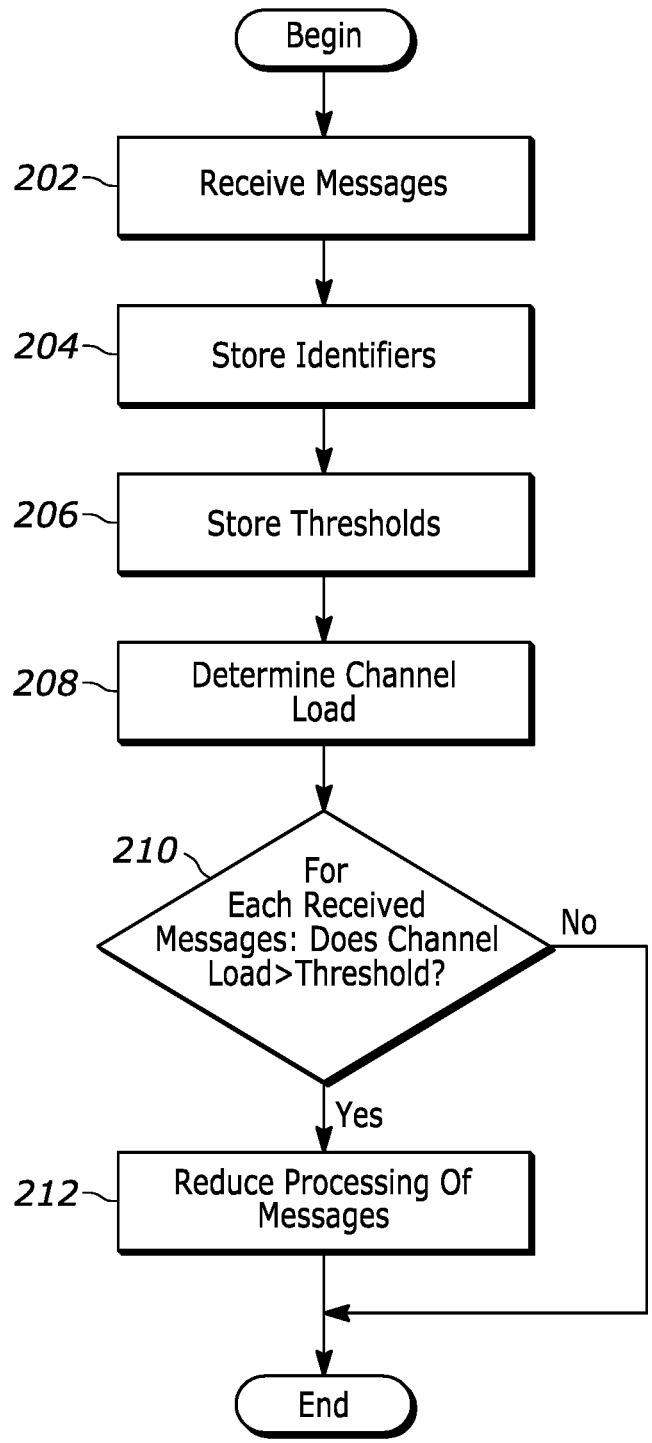
FIG. 2 comprises a flowchart of an approach according to various embodiments of the present invention.

Referring now to FIG. 2, one example of an approach for reducing congestion in a V2X network is described.

At step 202, electronic messages from senders are received over a communication channel. The messages may be in any appropriate communication format and be compliant with any V2X protocol. The communication channel may be a wireless communication channel specified by a frequency or by other parameters or characteristics.

At step 204, a sender identifier for each of the electronic messages is identified and the sender identifiers are stored in an electronic memory.

At step 206, a plurality of thresholds are stored in the electronic memory. Each of the plurality of thresholds is associated with a particular sender identifier from the sender identifiers. In examples, the sender identifier comprises a numeric or alphanumeric value. In still other examples, the sender identifier comprises a sender pseudonym. Other examples of sender identifiers are possible. At this point, the electronic memory includes an association between sender identifiers and thresholds associated with the identifiers.

At step 208, a channel load for the communication channel being used by the sender is determined. In aspects, the channel load is the percentage of the channel being used over a time period (i.e., the busy time of the channel over the busy time and idle time). Other examples of channel load are possible.

At step 210 and for each electronic message received over the communication channel, a determination is made as to whether the channel load exceeds a threshold associated with the sender that is associated with each electronic message. The threshold may be a predetermined threshold or the threshold may be dynamically changeable.

At step 212 and when the channel load exceeds the threshold, a reduced amount of future messages is processed from the sender associated with the electronic message. As described elsewhere herein, the approach for reducing the amounts of messages from a sender can take on a variety of forms such as processing n messages and then ignoring m messages where n and m are integers. Other examples are possible.

Figure 3:
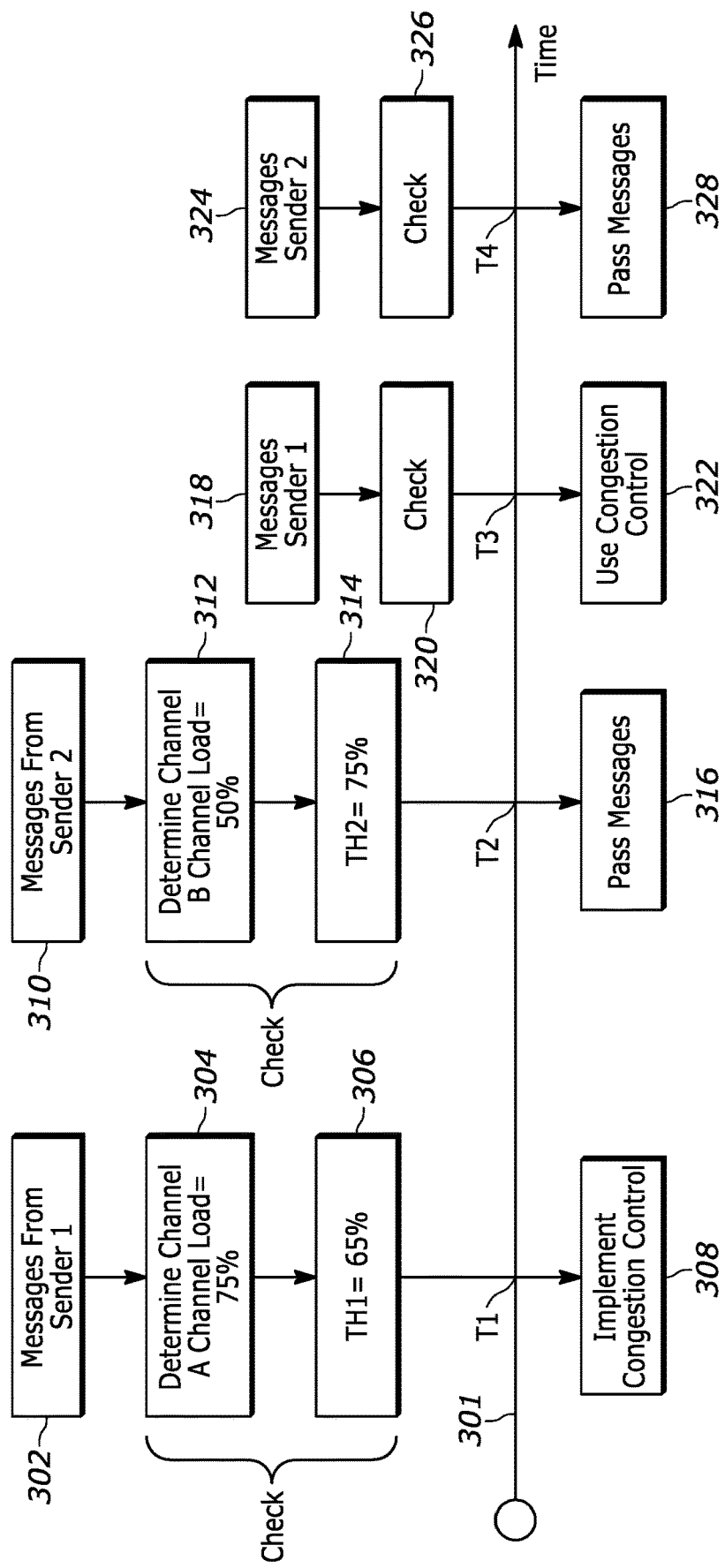
FIG. 3 comprises a flowchart of an approach according to various embodiments of the present invention.

Referring now to FIG. 3, one example of an approach of a congestion control approach that reduces the number of messages being processed from a particular sender is described. This example uses two senders (Sender 1 and Sender 2). Sender 1 sends messages to a VCU over communication channel A. Sender 2 sends messages to the VCU over communication channel B. In examples, the communication channels A and B are wireless communication channels defined by different frequencies. In this example, two channels are used, but it will be realized that communication may also occur over the same channel for both senders.

In this case, two thresholds are used and each threshold is associated with a specific sender (TH1 for Sender 1 and TH2 for sender 2). In this example, the thresholds are specific to a sender. In other examples, the thresholds are specific to a communication channel (e.g., TH1 could be for Channel A and TH2 for Channel B). In still other examples, the thresholds relate to both the sender and a communication channel. In yet other examples, the thresholds may be fixed, and in still other examples the thresholds may dynamically change over time.

This example shows events that happen over time (shown by a timeline 301 where time moves forward from left to right). Different events or steps occur at or around times T1, T2, T3, and T4 along the timeline 301. For example, events 302, 304, 306, and 308 occur at or around time T1. It will be appreciated that individual events shown as being at the same time may occur at slightly different times. For example, event 302 may occur slightly before event 304; event 304 slightly before event 306, and event 306 slightly before event 308. This is because the steps 302, 304, 306, and 308 are executed sequentially and are separated in time by how long machine language computer instructions executing on a processor take to execute. For instance, step 302 is executed by computer instructions and when finished step 304 is executed by other computer instructions and so forth. Certain example numeric values are also given with respect to FIG. 3 and it will be understood that these values can also be changed.

Turning now in greater detail to FIG. 3, at step 302 messages are received from sender 1 over channel A. At step 304 the processor determines that the channel load for Channel A is 75% and at step 306 determines that the first threshold (TH1 for sender 1) is 65%. At step 308, a comparison is made between the channel load and threshold and determination is made to implement a congestion control approach to reduce the number of messages processed by a processor at the receiver. This determination is made because the channel load exceeds the threshold. Future checks as to whether the congestion control approach may continue to be applied to messages from sender 1 may be made in the future at predetermined times (e.g., at time T3), periodically, or based upon groups of messages being received (e.g., after the next 100 messages are received from sender 1) to mention a few examples. In other words, the next check to determine whether congestion control should be used may occur a predetermined amount of time later or after a predetermined number of messages are received in these examples.

Time continues to move forward to time T2. At step 310 messages are received from sender 2 over channel B. At step 312 the processor determines that the channel load for Channel B is 50% and at step 314 determines that the second threshold (TH2 for sender 2) is 75%. At step 316, a comparison is made between the channel load and threshold and determination is made not to implement a congestion control approach to reduce the number of messages processed. This determination is made because the channel load does not exceed the threshold. Future checks as to whether to continue not applying a congestion control approach may occur at predetermined times (e.g., at time T4), periodically, or after predetermined number of messages are received (e.g., for the next 100 messages received from sender 2) to mention a few examples. In other words, the next check to determine whether congestion control should be used may occur a predetermined amount of time later or after a predetermined number of messages are received in these examples.

Time continues to move forward to time T3. At step 318, further messages from sender 1 are received. At step 320 a check is made (a determination is made as to whether the channel A load exceeds the threshold TH1). In this case, the load still exceeds the threshold TH1 so the congestion control approach of reducing the number of messages processed by the processor at the receiver continues with step 322.

Time moves forward to time T4. At step 324, further messages from sender 2 are received over channel B. At step 326 a check is made (a determination is made as to whether the channel B load exceeds threshold TH2). In this case, the load does not exceed the threshold TH2 so no congestion control approach is used, i.e., all messages are passed to the processor at the receiver. In another example, if the load for channel B had changed between T2 and T4, so that the load exceeded TH2 at T4, then a congestion control approach of reducing the number of messages processed would be implemented at step 326.

In other examples, different thresholds are used for the same sender over different channels. For example, Sender 1 may have a first threshold for Channel A, but a second and different threshold for Channel B. In still other examples, all thresholds for a sender are the same no matter which channel is used.

Figure 4:
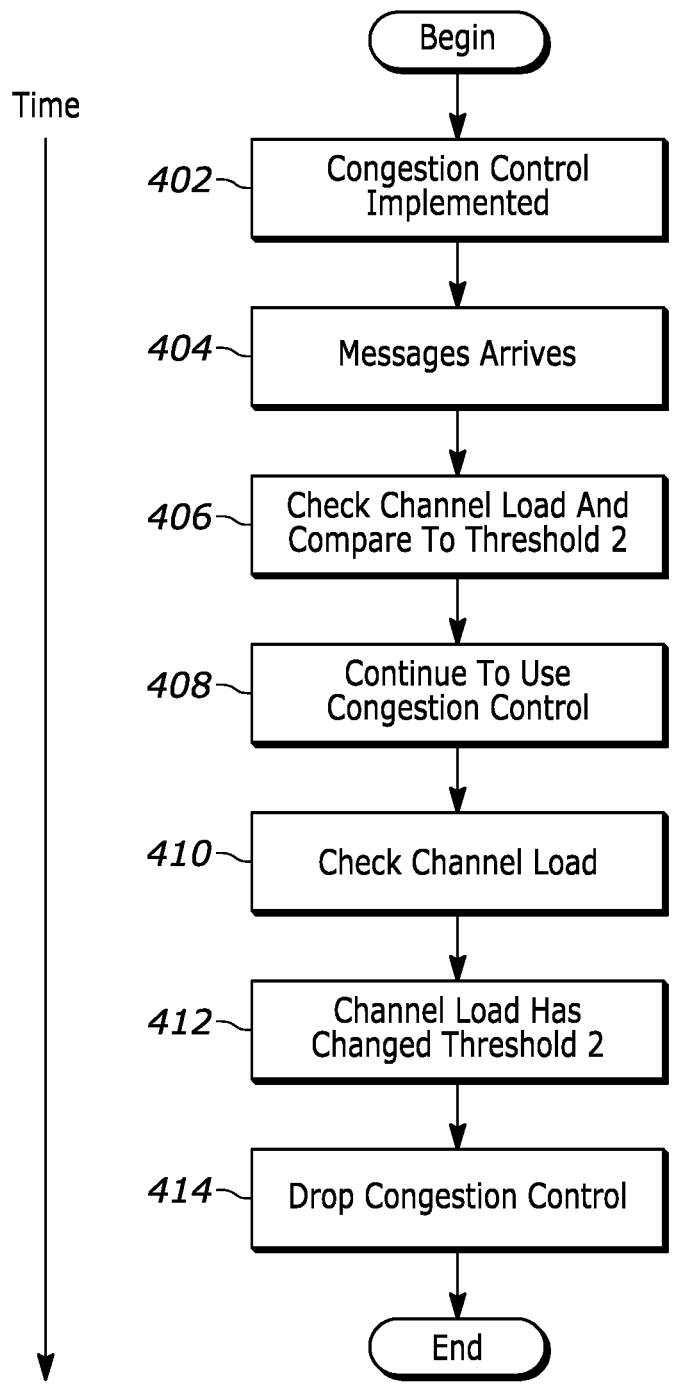
FIG. 4 comprises a flowchart of an approach according to various embodiments of the present invention.

Referring now to FIG. 4, one example of processing messages from a single sender using hysteresis is described. In this example, messages from a sender are being processed at a reduced rate according to a congestion reduction scheme. A change in channel load occurs and it is determined whether to drop use of the congestion reduction scheme. Rather than making an immediate change (i.e., using congestion control and then ceasing to use congestion control), the system uses a hysteresis approach and waits for a predetermined amount of time before actually dropping congestion control. The system uses two thresholds (threshold 1 and threshold 2), where threshold 2 is less than threshold 1. For example, threshold 1 may be 10 and threshold 2 may be 5.

At step 402, a congestion control approach of reducing the number of messages processed has been implemented for a sender over a communication channel. This was implemented because the channel load exceeded threshold 1.

At step 404, Message 1 from sender 1 is received. At step 406, a check is made to see if the channel load is less than or equal to threshold 2 and it is determined that the channel load is not less than or equal to threshold 2. At step 408, the congestion control approach of reducing the number of messages processed continues to be implemented for a sender over the communication channel.

At step 410, the channel load is again checked. At step 412, it is determined that the channel load is now less than threshold 2.

At step 414, the congestion control scheme of processing a reduced number of messages is dropped. The use of two different thresholds for moving between states (i.e., a state of using congestion control and a state of not using congestion control) ensures that congestion control will not be dropped too quickly. This approach ensures that the system is stable and not constantly jittering between states and helps to maintain system stability.

It should be understood that any of the devices described herein (e.g., the control circuits, the controllers, the receivers, the transmitters, the sensors, any presentation or display devices, or the external devices) may use a computing device to implement various functionality and operation of these devices. In terms of hardware architecture, such a computing device can include but is not limited to a processor, a memory, and one or more input and/or output (I/O) device interface(s) that are communicatively coupled via a local interface. The local interface can include, for example but not limited to, one or more buses and/or other wired or wireless connections. The processor may be a hardware device for executing software, particularly software stored in memory. The processor can be a custom made or commercially available processor, a central processing unit (CPU), an auxiliary processor among several processors associated with the computing device, a semiconductor based microprocessor (in the form of a microchip or chip set) or generally any device for executing software instructions.

The memory devices described herein can include any one or combination of volatile memory elements (e.g., random access memory (RAM), such as dynamic RAM (DRAM), static RAM (SRAM), synchronous dynamic RAM (SDRAM), video RAM (VRAM), and so forth)) and/or nonvolatile memory elements (e.g., read only memory (ROM), hard drive, tape, CD-ROM, and so forth). Moreover, the memory may incorporate electronic, magnetic, optical, and/or other types of storage media. The memory can also have a distributed architecture, where various components are situated remotely from one another, but can be accessed by the processor.

The software in any of the memory devices described herein may include one or more separate programs, each of which includes an ordered listing of executable instructions for implementing the functions described herein. When constructed as a source program, the program is translated via a compiler, assembler, interpreter, or the like, which may or may not be included within the memory.

It will be appreciated that any of the approaches described herein can be implemented at least in part as computer instructions stored on a computer media (e.g., a computer memory as described above) and these instructions can be executed on a processing device such as a microprocessor. However, these approaches can be implemented as any combination of electronic hardware and/or software.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A method for reducing congestion in a vehicle-to-everything (V2X) network, the method comprising:
receiving electronic messages from senders over a communication channel, determining a sender identifier for each of the electronic messages, and storing the sender identifiers in an electronic memory;
storing a plurality of thresholds in the electronic memory, each of the plurality of thresholds being associated with a particular sender identifier from the sender identifiers;
determining a channel load for the communication channel;
for each of a plurality of electronic messages subsequently received over the communication channel:
determining whether the channel load exceeds a threshold associated with a sender associated with each of the plurality of electronic messages;
when the channel load exceeds the threshold, processing a reduced amount of future messages from the sender associated with the electronic message; and
wherein hysteresis is used to halt the processing of the reduced amount of messages, wherein the hysteresis comprises waiting for a predetermined amount of time before halting the processing of the reduced amount of messages.

2. The method of claim 1, wherein the channel load defines an amount of the channel being utilized for messages over a timeframe or time period.

3. The method of claim 1, wherein processing a reduced amount of future messages comprises processing only every nth message received from the sender, where n is an integer.

4. The method of claim 1, wherein processing a reduced amount of future messages comprises processing n messages from the sender, then dropping m messages from the sender, where n and m are integers.

5. The method of claim 1, wherein the sender identifier comprises a numeric or alphanumeric value.

6. The method of claim 1, wherein the sender identifier comprises a sender pseudonym.

7. A system for reducing congestion in a vehicle-to-everything (V2X) network, the system comprising:
an electronic memory;
a transceiver device configured to receive electronic messages from senders over a communication channel;
a processor, the processor coupled to the transceiver device and the electronic memory, the processor configured to:
determine a sender identifier for each of the electronic messages, and store the sender identifiers in the electronic memory;
store a plurality of thresholds in the electronic memory, each of the plurality of thresholds associated with a particular sender identifier from the sender identifiers;
determine a channel load for the communication channel;
for each of the electronic messages received over the communication channel:

determine whether the channel load exceeds a threshold associated with a sender associated with each electronic message;

when the channel load exceeds the threshold, process a reduced amount of future messages from the sender associated with the electronic message; and wherein hysteresis is used to halt the processing of the reduced amount of messages, wherein the hysteresis comprises waiting for a predetermined amount of time before halting the processing of the reduced amount of messages.

8. The system of claim 7, wherein the channel load defines an amount of the channel being utilized for messages over a timeframe or time period.

9. The system of claim 7, wherein the processor processes only every nth message received from the sender, where n is an integer.

10. The system of claim 7, wherein the processor processes n messages from the sender, then drops m messages from the sender, where n and m are integers.

11. The system of claim 7, wherein the sender identifier comprises a numeric or alphanumeric value.

12. The system of claim 7, wherein the sender identifier comprises a sender pseudonym.

13. A non-transitory, machine-accessible storage medium having computer instructions and wherein the instructions are configured, when executed on a processor to cause the machine to:

receive electronic messages from senders over a communication channel, determine a sender identifier for each of the electronic messages, and store the sender identifiers in an electronic memory;

store a plurality of thresholds in the electronic memory, each of the plurality of thresholds associated with a particular sender identifier from the sender identifiers;

determine a channel load for the communication channel:

for each of the electronic messages received over the communication channel;

determine whether the channel load exceeds a threshold associated with a sender associated with each electronic message;

when the channel load exceeds the threshold, process a reduced amount of future messages from the sender associated with the electronic message; and wherein hysteresis is used to halt the processing of the reduced amount of messages, wherein the hysteresis comprises waiting for a predetermined amount of time before halting the processing of the reduced amount of messages.

14. The storage medium of claim 13, wherein the channel load defines an amount of the channel being utilized for messages over a timeframe or time period.

15. The storage medium of claim 13, wherein processing a reduced amount of future messages comprises processing only every nth message received from the sender, where n is an integer.

16. The storage medium of claim 13, wherein processing a reduced amount of future messages comprises processing n messages from the sender, then dropping m messages from the sender, where n and m are integers.

17. The storage medium of claim 13, wherein the sender identifier is a numeric or alphanumeric value.

18. The method of claim 1, wherein the predetermined amount of time is between 200 milliseconds and 1 second.

19. The system of claim 7, wherein the predetermined amount of time is between 200 milliseconds and 1 second.

20. The storage medium of claim 13, wherein the predetermined amount of time is between 200 milliseconds and 1 second.

* * * * *